Patented June 17, 1930

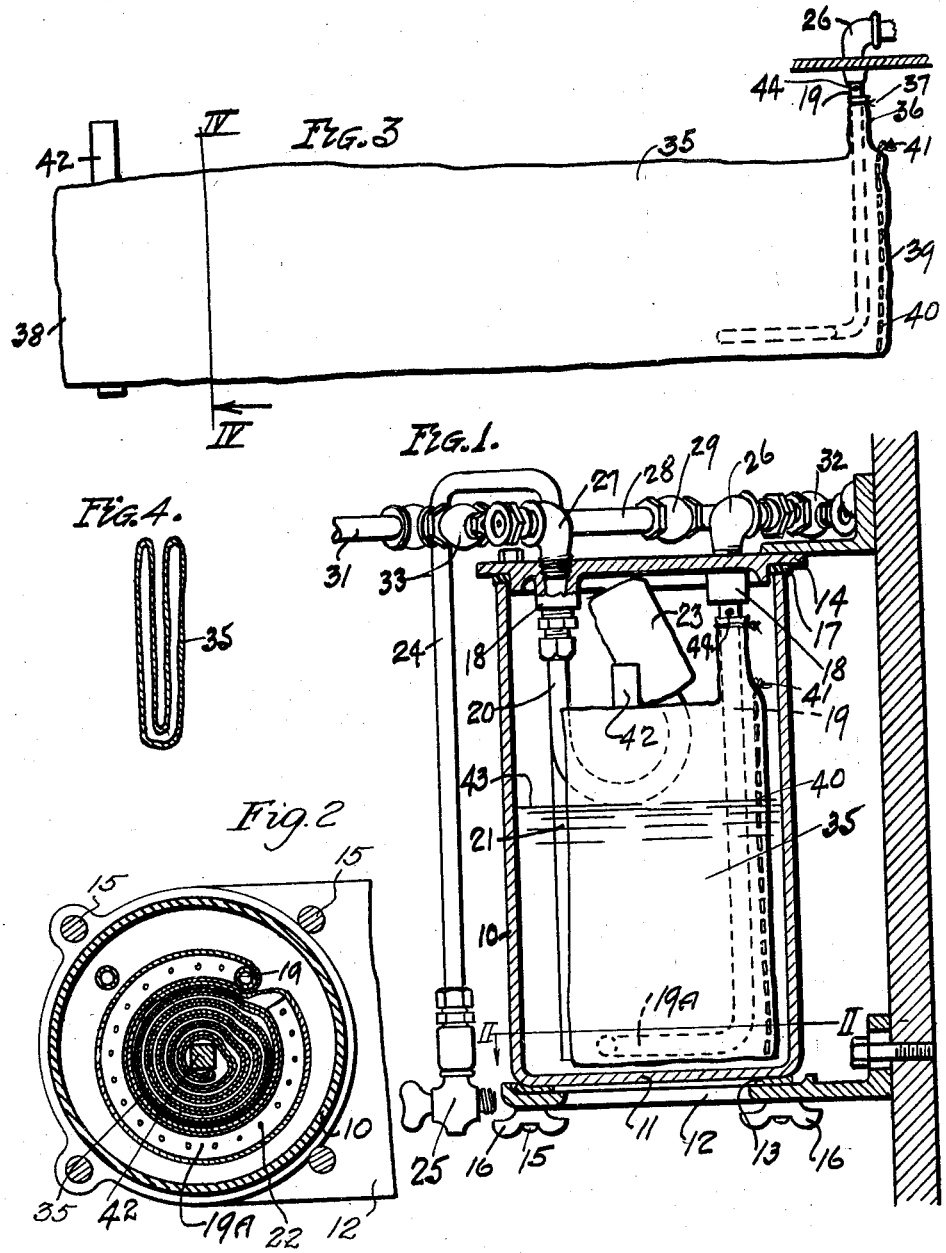

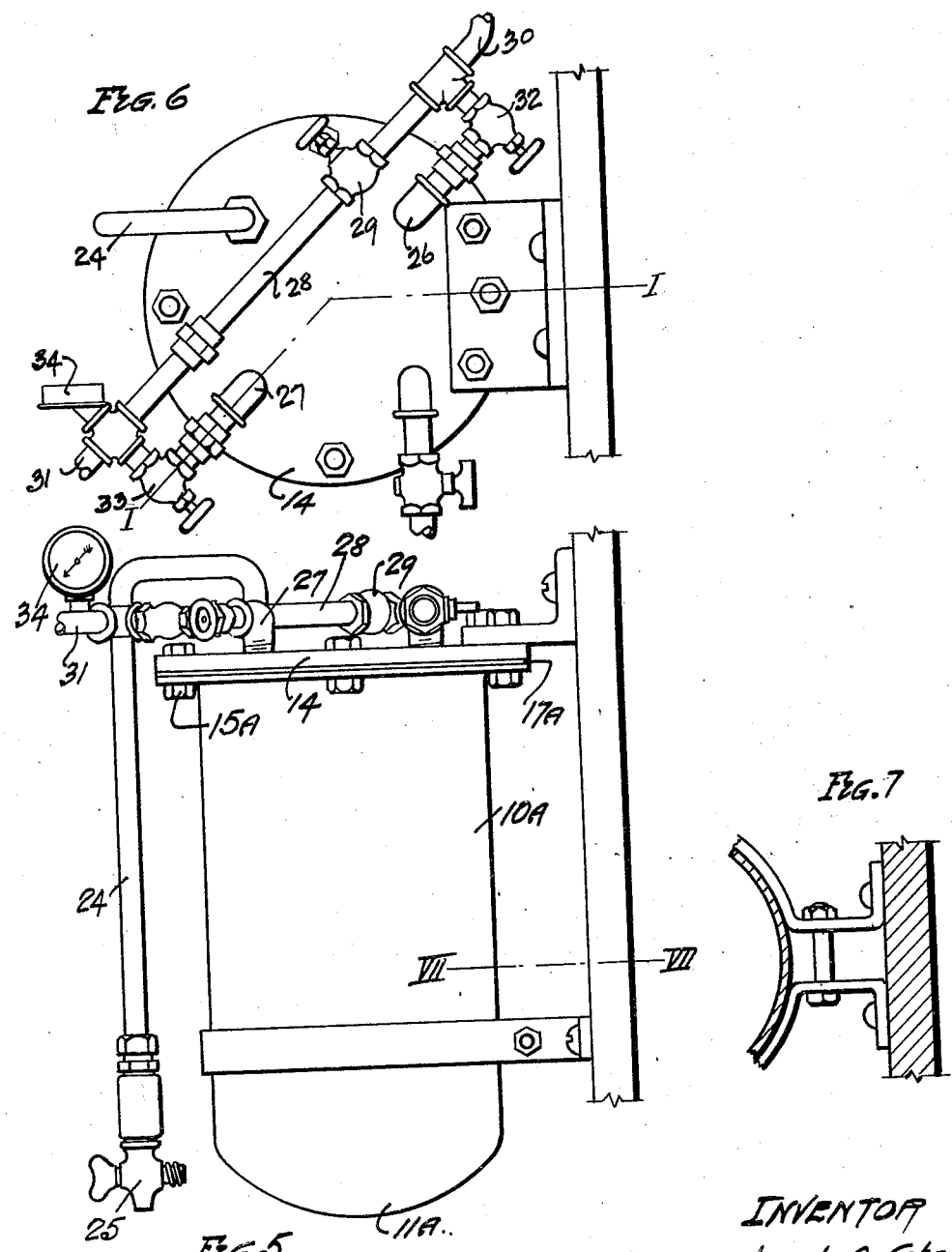

1,765,323

UNITED STATES PATENT OFFICE

FREDERICK O. CATRON, OF MEMPHIS, TENNESSEE, ASSIGNOR OF ONE-HALF TO NETTIE P. CATRON, OF MEMPHIS, TENNESSEE

FILTER FOR LIQUIDS

Application filed September 3, 1927. Serial No. 217,430.

This invention relates to new and useful improvements in filters for liquids and relates primarily to devices for filtering oils.

It has especial relation to devices for filtering gasoline or other fuel oils for internal combustion engines.

This filter is of a type embodying a container into which the liquid to be filtered may be discharged through a filtering medium in the form of a bag which preferably will retain the foreign matter filtered from the liquid, and permit the filtered liquid to be removed through a second pipe. It is further of a type which permits the bag to be removed together with the foreign matter accumulated therein, and which permits the liquid being by-passed directly to its point of use without having to pass through the filtering medium, during such change or at any other times when it may be desired.

Water may be used in the lower portion of the container, to aid in filtering and washing the liquid, and the liquid inlet passage includes a tube within the jar extending to a point below the water level, if water be used, so that the liquid to be washed and filtered, in order to reach the filtered liquid outlet at the upper portion of the jar, must pass through the water and deposit all foreign substances in the latter.

The objects of my invention are:

(a) To provide means for collecting the sediment removed from the liquid, so that it may be easily and quickly removed from the container and the device to be quickly again put in use;

(b) To provide means for equalizing the flow of the liquid and distributing it equally and gently to the surfaces of the filtering medium used;

(c) To provide means for enclosing the sediment filtered out so that subsequent passage of liquid will not cause the residue, especially the lighter parts thereof, to be again taken up and carried out of the container; and (d) To generally improve the design and construction of such devices.

The means by which the foregoing and other objects are accomplished, and the manner of their accomplishment will readily be understood from the following specification on reference to the accompanying drawings in which:—

Fig. 1 is a vertical sectional elevation taken, as on line I—I of Fig. 6, of a container, which may be of glass, showing the filtering device therein.

Fig. 2 is a horizontal section of the container on the line II—II of Fig. 1.

Fig. 3 is a view of the sediment bag as placed on the inlet pipe and before the bag is rolled up for placing in the container.

Fig. 4 is a cross section of the bag, taken on the line IV—IV of Fig. 3.

Fig. 5 is a side elevation of a slightly modified form of container preferably made of metal.

Fig. 6 is a plan view of the container and exterior pipes.

Fig. 7 is a fragmentary detail of a portion of a clamp used in supporting the container.

Referring now to the drawings in which the various parts are indicated by numerals.

10 is the container, having an integral bottom 11, and adapted to be carried by a supporting bracket 12. 13 is a cushion ring disposed between the container and the bracket, if the former should be of glass. The upper end of the container is closed by a cap or plate 14, which may be clamped to the supporting bracket, as by bolts 15. Preferably these bolts are provided with wing nuts 16, which may be easily loosened in disconnecting and removing the container. 17 is a sealing gasket disposed between the upper end of the container and the cap 14.

In Figs. 5 and 6 a modified form of container 10A is shown, which container is preferably of metal. This container has a dished bottom 11A and its upper edge is flanged and directly secured to the cap 14 as by the bolts 15A. A sealing gasket 17A preferably of cork or rubber is used between the flange and this cap.

Depending below the under surface of the cap 14, are bosses 18 into which pipes 19, 20 and 21 may be screwed or otherwise secured. The first of these pipes 19 serves as an inlet pipe and extends downward to a point near the bottom of the container and is there bent laterally substantially at right angles to the vertical section and at the same time is curved into substantially the shape of a letter C lying in a horizontal plane. This portion 19A of the pipe is provided with a number of holes 22 through which the liquid to be filtered escapes. The pipe 20 is the outlet pipe which starting downward is reversely curved to an upright position and the end covered with a secondary filtering medium 23, preferably chamois skin, the detail and construction of this member being more fully shown and described in my Patent No. 1,636,285 issued July 19th, 1927. 21 is a siphon pipe extending to the bottom of the container, and having an exterior extension 24 curving over and downward, the lower end of this pipe being provided with a valve 25 which terminates below the container bottom.

Above the container cap 14, the pipe 19, is provided with an elbow 26, and similarly the pipe 20, is provided with an elbow 27. 28 is a through pipe line which is provided with a valve 29. One end of this pipe 30 leads from the fuel supply, the other end 31 leads to the carburetor (not shown). The elbow 26 is connected through a valve 32 with the supply end 30 of this pipe and the elbow 27 through a valve 33 with the discharge end. 34 is a gauge connected to the discharge end.

Within the container 10 or 10A as the case may be, a bag 35 encloses the inlet pipe 19. This bag as shown in unrolled form in Fig. 3 is provided with a neck 36 through which the pipe 19 is inserted into the bag, this neck is securely tied to the pipe 19 at the point 37. The bag is made of a filtering material such as a more or less closely woven cloth which will permit the passage of the liquid therethrough, but which is adapted to prevent the passage of the sediment, and is preferably woven in a single piece with a closed end 38, however, the end 38 may as well as one or both of the longitudinal edges of the bag may be permanently closed by close stitching instead. The opposite end 39 of the bag, however, is preferably closed by a removable lace or cord 40, the ends 41 of which may be securely tied together to form a closure for the bag.

After the pipe 19 has been placed in the bag and the neck 36 has been securely tied, the bag may be longitudinally folded to the form shown in Fig. 4, provided the width thereof be great enough to permit such folding and be rolled up, beginning at the end 38. Preferably a wooden stick 42 is used, around which the bag is rolled and after rolling, the bag and the pipe 19 is slipped within the container 10 or 10A as the case may be and the cap 14 securely clamped, and the filter is ready for use.

To use the device the valve 29 is closed and liquid either flows or is forced through the pipe 30, thence through the pipe 19, from which it is gently distributed through the holes 22 in the bottom portion 19A, and is thence allowed to flow through the filter bag 35 into the container, from which it flows or is forced through the secondary filter 23 and the pipe 20 to the discharge pipe 31. It will of course be understood that if the liquid be drawn through the filter by vacuum, as in the ordinary vacuum feed for automobiles the same cycle will be accomplished.

The liquid in passing through the filter bag 35 leaves the sediment therewithin, it then bubbles upward through the water 43 in the container, if water be used, where it is washed and possibly additional impurities separated out. It then passes through the secondary filter which removes any trace of water and outward through the pipe 20 as before described.

As the filter is used and deposit of sediment is made on the bag in proximity to the pipe 19, additional portions of the bag will loosen up and come into use, which process will continue until the bag becomes jammed and the filter clogged. Should, through inadvertance or otherwise, a sufficient amount of sediment be allowed to accumulate within the bag as to check or seriously impede the flow of the liquid, openings 44 are provided in the pipe 19, which permit the by-passing of the liquid without the necessity of its passing through the filter bag. When the bag has been in use a sufficient time to accumulate enough sediment to require its removal, the valve 32 and 33 may be closed, the valve 29 be opened and the liquid be by-passed from the pipe 30 to the pipe 31. Thereafter the securing bolts may be removed and the container taken off so that the bag becomes accessible. The bag may be removed by untying the cord 37 and withdrawing the pipe 19 through the neck 36 of the bag, and after such removal, the cord 40 may be removed and the bag opened and turned inside out, to dispose of its sediment content. In the mean time if desired an additional clean bag may be placed into position, and coiled, and the container then again be assembled for use. It will of course be obvious that should the sediment on the pipe 19 prevent its removal through the neck of the bag, the end of the bag may be opened and the sediment loosened from the pipe before attempting the removal of the bag therefrom. Preferably after the bag has been removed a new bag is placed in position, as just above described, and the old bag not only emptied of its sediment contents but washed or otherwise treated to restore it to proper condition for further use.

If desired the by-pass within the container indicated in these drawings and shown and described in my Patent No. 1,636,285 above mentioned may be used instead of the by-pass shown and described herein.

It will be understood that the drawings and description herein are illustrative only and that I do not wish to be limited to the specific details there shown except as the same may be set hereinafter in the claims.

Having described my invention, what I claim is:

1. In a filter for liquids, a container, sealing means therefor, an inlet pipe leading into said container and terminating near the bottom thereof in a horizontal, substantially C shaped, a loop portion having a plurality of perforations therein, a discharge pipe leading from the upper portion of said container, and a filtering bag enclosing said inlet pipe, and spread apart by said loop portion.

2. In a filter for liquids, a container, sealing means therefor, an inlet pipe leading into said container and terminating near the bottom thereof in a horizontal, substantially C shaped loop, said loop portion having a plurality of perforations therein, a discharge pipe leading from said container, and a filtering bag, having a portion enclosing said inlet pipe and spread apart by said loop, and an additional portion coiled within said container.

3. In a filter for liquids, a container, a top therefor, an inlet pipe passing downward through said top into said container, adjacent one side thereof, a discharge pipe leading from the upper portion of said container, and a sediment retaining bag doubled along its longitudinal center line, and loosely and unrestrainedly coiled, disposed in said container along and adjacent to said inlet pipe, and having the outer half of its peripheral end disposed and secured around said inlet pipe.

4. In a filter for liquids, a container, a top therefor, a discharge pipe leading from said container, a loosely and unrestrainedly coiled sediment retaining filter bag disposed in said container, and a perforated inlet pipe, leading through said top, downward into said container, adjacent the side thereof, the axis of said bag coil lying parallel to said pipe, said pipe leading downward inside the flat bag at one end, and from top to bottom thereof, said bag being removably secured thereto.

In testimony whereof I hereunto affix my signature.

FREDERICK O. CATRON.